(12) United States Patent
Feng et al.

(10) Patent No.: US 10,347,203 B2
(45) Date of Patent: Jul. 9, 2019

(54) GOA DRIVE CIRCUIT AND LIQUID CRYSTAL DISPLAY PANEL

(71) Applicant: Shenzhen China Star Optoelectronics Technology Co., Ltd., Shenzhen, Guangdong (CN)

(72) Inventors: Tuo Feng, Guangdong (CN); Xiangyang Xu, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 145 days.

(21) Appl. No.: 15/539,727

(22) PCT Filed: May 4, 2017

(86) PCT No.: PCT/CN2017/083061
§ 371 (c)(1),
(2) Date: Jun. 26, 2017

(87) PCT Pub. No.: WO2018/196020
PCT Pub. Date: Nov. 1, 2018

(65) Prior Publication Data
US 2018/0308441 A1    Oct. 25, 2018

(30) Foreign Application Priority Data

Apr. 25, 2017    (CN) .............................. 201710278620

(51) Int. Cl.
*G09G 3/36* (2006.01)
*G02F 1/1345* (2006.01)

(52) U.S. Cl.
CPC ....... *G09G 3/3648* (2013.01); *G02F 1/13454* (2013.01); *G09G 3/3677* (2013.01); *G09G 2300/0814* (2013.01); *G09G 2310/0218* (2013.01); *G09G 2310/0286* (2013.01); *G09G 2310/08* (2013.01)

(58) Field of Classification Search
CPC .............. G09G 3/3648; G09G 3/3677; G09G 2300/0814; G09G 2310/0218; G09G 2310/0286; G09G 2310/08; G02F 1/13454
See application file for complete search history.

(56) References Cited

U.S. PATENT DOCUMENTS

| 2006/0187177 | A1  | 8/2006  | Kuo et al. |
| 2012/0293737 | A1  | 11/2012 | Li et al. |
| 2015/0228353 | A1* | 8/2015  | Qing ...................... G11C 19/28 377/75 |
| 2016/0216820 | A1* | 7/2016  | Sung ...................... G06F 3/0412 |

FOREIGN PATENT DOCUMENTS

CN        101807436 A        8/2010

* cited by examiner

*Primary Examiner* — Julie Anne Watko

(57) ABSTRACT

Disclosed is a GOA drive circuit, including a plurality of GOA drive units. Each trigger unit in first K GOA drive units includes a first thin film transistor, which has a gate connected to a trigger clock corresponding to the trigger unit. The trigger clock is configured to turn off the trigger unit when a scan clock of an output unit corresponding to the trigger unit is at a high level.

18 Claims, 5 Drawing Sheets

GOA DRIVE CIRCUIT AND LIQUID CRYSTAL DISPLAY PANEL

CROSS-REFERENCE TO RELATED APPLICATIONS

This application claims the priority of Chinese patent application CN 201710278620.5, entitled "GOA drive circuit and liquid crystal display panel" and filed on Apr. 25, 2017, the entirety of which is incorporated herein by reference.

FIELD OF THE INVENTION

The present disclosure relates to the field of display technologies, and in particular, to a GOA drive circuit and a liquid crystal display panel.

BACKGROUND OF THE INVENTION

As more and more liquid crystal display devices of superior quality are produced at low costs, the gate driver on array (GOA) technology has been widely used due to its advantages such as low costs and high integration.

However, in an existing GOA drive circuit, when trigger units of a plurality of GOA drive units are all triggered by start vertical signals (STV), since first K scan clocks (CKs) are activated during a high level period, they constantly stay in a high level. This weakens a potential at scan control signal point Q (as shown in FIG. 2) of each of first K scan control signals under a coupling effect of a bootstrap capacitor. As a result, a long time is necessary for first K gate lines to achieve a required high potential, thereby leading to poor charging, which further deteriorates display effects and quality of the display device.

In view of the foregoing, it is desirable to provide a new design of a GOA drive circuit for solving the above problem.

SUMMARY OF THE INVENTION

In view of the above technical problem, the present disclosure provides a GOA drive circuit and a liquid crystal display panel, which alleviate an insufficient opening condition of thin film transistors in output units of first K GOA drive units, through addition of thin film transistors into trigger units of the first K GOV drive units for controlling input of a start vertical signal, thereby improving quality of a display screen.

According to one aspect of the present disclosure, a GOA drive circuit is provided, comprising a plurality of GOA drive units, each GOA drive unit including a trigger unit and an output unit connected to each other, wherein each trigger unit in first K GOA drive units comprises a first thin film transistor and a second thin film transistor, wherein the first thin film transistor has a gate connected to a trigger clock corresponding to the trigger unit, a drain connected to a start vertical signal, and a source connected to a gate and a drain of the second thin film transistor, and a source of the second thin film transistor is connected to a control terminal of an output unit connected to the trigger unit, K being an integer larger than 0, and wherein the trigger clock is configured to turn off the trigger unit when a scan clock of the output unit is at a high level.

According to an embodiment of the present disclosure, an output signal of an $m^{th}$ GOA drive unit is a trigger signal of an $(m+N/2)^{th}$ GOA drive unit, N being number of scan clocks in the GOA drive circuit, and $N=2(K+1)$, wherein m is an integer satisfying $0<m\leq M$, M being number of GOA drive units.

According to an embodiment of the present disclosure, a trigger unit in a $(K+1)^{th}$ GOA drive unit includes a third thin film transistor, which has a gate and a drain connected to the start vertical signal, and a source connected to a control terminal of an output unit in the $(K+1)^{th}$ GOA drive unit.

According to an embodiment of the present disclosure, a trigger unit in each GOA drive unit following the $(K+1)^{th}$ GOA drive unit includes a fourth thin film transistor, which has a gate and a drain connected to a trigger signal corresponding to the trigger unit, and a source connected to a control terminal of an output unit connected to the trigger unit.

According to an embodiment of the present disclosure, a trigger clock corresponding to a trigger unit of a $k^{th}$ GOA drive unit is a scan clock of an output unit in a $(k+N/2)^{th}$ GOA drive unit, k being an integer satisfying $0<k\leq K$.

According to an embodiment of the present disclosure, K equals 3.

According to an embodiment of the present disclosure, all GOA drive units included in the GOA drive circuit are connected in sequence, and an output signal of a previous-stage GOA drive unit is a trigger signal of its next-stage GOA drive unit, and K=1.

According to an embodiment of the present disclosure, a trigger clock corresponding to a trigger unit of a first-stage GOA drive unit is any one of H scan clocks except a scan clock of the first-stage GOA drive unit, H being number of scan clocks in the GOA drive circuit.

According to an embodiment of the present disclosure, a trigger unit in each GOA drive unit following the first-stage GOA drive unit includes a fifth thin film transistor, which has a gate and a drain connected to a trigger signal corresponding to the trigger unit, and a source connected to a control terminal of an output unit connected to the trigger unit.

According to a second aspect of the present disclosure, a liquid crystal display panel is provided, comprising the above-described GOA drive circuit.

One or more embodiments of the above-described solutions may have the following advantages or benefits as compared with the prior art.

The GOA drive circuit described in the present disclosure can be used to lift a potential at scan control signal points Q (k) in first K rows by a coupling effect of a bootstrap capacitor, when first K scan clocks are at high potential, so as to prevent scan lines of the first K rows from being poorly charged due to late deactivation of the start vertical signal. The GOA drive circuit described in the present disclosure can alleviate the poor charging condition of the first K rows of scan lines, thereby improving the quality of the display screen.

Other features and advantages of the present disclosure will be further explained in the following description, and partly become self-evident therefrom, or be understood through implementation of the present disclosure. The objectives and advantages of the present disclosure will be achieved through the structure specifically pointed out in the description, claims, and the accompanying drawings.

BRIEF DESCRIPTION OF THE DRAWINGS

The drawings are provided for further understanding of the present disclosure, and constitute one part of the description. They serve to explain the present disclosure in conjunction with the embodiments, rather than to limit the present disclosure in any manner. In the drawings.

DETAILED DESCRIPTION OF THE EMBODIMENTS

The present disclosure will be explained in detail below in conjunction with the embodiments and the accompanying drawings, so that one can fully understand how the present disclosure solves the technical problem and achieves the technical effects, and thereby implement the same. It should be noted that any of the embodiments and any of the technical features thereof may be combined with one another as long as no conflict is caused, and the technical solutions obtained therefrom fall into the scope of the present disclosure.

Embodiment 1

Figure 1:
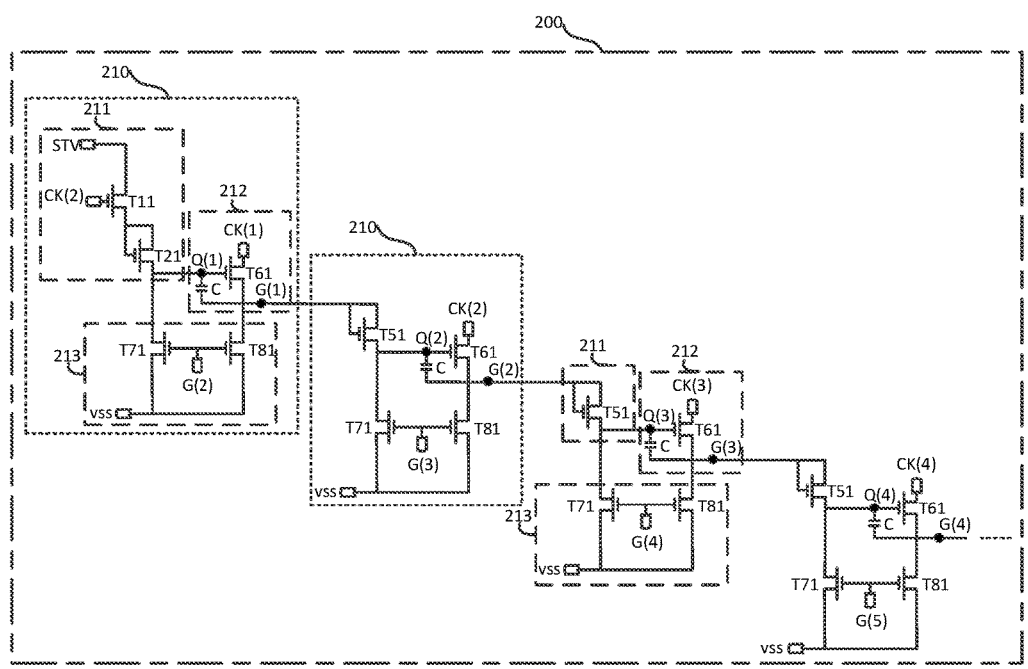
FIG. 1 schematically shows the structure of a GOA drive circuit having H scan clocks in an embodiment of the present disclosure.

FIG. 1 schematically shows the structure of a GOA drive circuit 200 having H scan clocks (CKs) according to an embodiment of the present disclosure, wherein H, an integer larger than 0, is the number of CKs provided in the GOA drive circuit 200. As shown in FIG. 1, the drive circuit 200 comprises a plurality of GOA drive units 210 which are connected to one another in sequence. Specifically, an output signal of a previous-stage GOA drive unit 210 is used to serve as a trigger signal of its next-stage GOA drive unit 210, and a trigger signal of a first-stage GOA drive unit 210 is generated under the control of a trigger clock. The specific structure of the drive circuit 200 will be described bellow in detail with reference to FIG. 1.

At the outset, description will be provided for the structure of the first-stage GOA drive unit 210, which mainly comprises a trigger unit 211, an output unit 212, and a pull-down unit 213.

The trigger unit 211 is mainly used to control active time of the output unit 212, so as to realize row-by-row scan of a liquid crystal display panel. Specifically, the trigger unit 211 includes a first thin film transistor (TFT) T11 and a second TFT T21. The T11 is used to output a start vertical signal (STV) as a trigger signal. The T11 has a gate connected to the trigger clock, a drain connected to the STV, and a source used to generate the trigger signal. The source of the T11 is connected to a gate and a drain of the T21, which is used to output a scan control signal Q (1) of a first row. The gate and the drain of the T21 are connected to each other, for receiving the trigger signal generated by the source of the T11, and a source of the T21 is used to generate the scan control signal Q (1) of the first row. The source of the T21 is connected to a control terminal of the output unit 212.

The output unit 212 is mainly used to output a first CK signal CK (1) as a scan signal G (1) of the first row. Specifically, the output unit 212 includes a sixth TFT T61 and a bootstrap capacitor C. A gate of the T61, as the control terminal of the output unit 212, receives the scan control signal Q (1) of the first row generated by the trigger unit 211. A drain of the T61, as an input terminal of the output unit 212, receives the first CK signal CK (1). A source of the T61, as an output terminal of the output unit 212, connects to a gate line G (1) of the first row, for generating and outputting the scan signal G (1) of the first row. The bootstrap capacitor C has one terminal connected to the gate of the T61, and another terminal connected to the source of the T61. The bootstrap capacitor C is used to store a voltage of the gate and the source of the T61 (a voltage of the gate and the source is an voltage difference between the gate and the source) when Q (1) is high, and to lift the voltage of the gate of the T61 for a second time after G (1) outputs the scan signal G (1) of the first row (i.e., when CK (1) is high, a potential at the scan control signal point Q (1) of the first row is lifted by a coupling effect of the bootstrap capacitor C), such that the T61 can be reliably started to output the scan signal G (1) of the first row.

In the present embodiment, the trigger clock connected to the gate of the T11 is configured to turn off the trigger unit 211 when the CK signal CK (1) received by the input terminal of the output unit 212 is high. Specifically, during a period before the CK signal CK (1) varies from a low potential to a high potential, the trigger clock controls the trigger unit 211 in an active state, while during a period when the CK signal CK (1) varies from the low potential to the high potential and is kept high, the trigger clock controls the trigger unit 211 in an inactive state.

Further, during the period before the CK signal CK (1) varies from the low potential to the high potential, the trigger clock controls the T11 in an active state, while during the period when the CK signal CK (1) varies from the low potential to the high potential and is kept high, the trigger clock controls the T11 in an inactive state.

In the present embodiment, the T11 and the T21 are preferably N-type thin film transistors. Thus, at the outset, during the period before the CK signal CK (1) varies from the low potential to the high potential, the trigger clock is kept high so as to turn on the T11 to generate the trigger signal, thereby enabling the T21, after receiving the trigger signal at its gate and drain, to be turned on and generate the scan control signal Q (1) of the first row. Next, during the period when the CK signal CK (1) varies from the low potential to the high potential and remains at the high potential, the trigger clock is kept low so as to turn off the T11. As a result, the potential of the point Q (1) can be lifted under the coupling effect of the bootstrap capacitor C. Therefore, compared with the prior art, the first TFT T11 can be added according to the present embodiment, so as to prevent the scan line G (1) of the first row from being poorly charged due to late deactivation of the STY.

In the present embodiment, in order to enable simple and convenient control, the trigger clock to which the gate of the T11 is connected is preferably configured to be any one of H CKs except the first scan clock CK (1). In other words, the trigger clock to which the gate of the T11 is connected in this embodiment may be any one of the remaining H−1 CKs after CK (1) is removed. Further, in the present embodiment, the trigger clock to which the gate of the T11 is connected is a second scan clock CK (2). Of course, it is also possible to separately set a clock signal as the trigger clock to which the gate of the T11 is connected, as long as the clock signal can control the trigger unit 211 in an active state during the period before the scan clock CK (1) of the output unit 212 varies from the low potential to the high potential, and control the trigger unit 211 in an inactive state during the period when the scan clock CK (1) of the output unit 212 varies from the low potential to the high potential. Therefore, in a specific implementing procedure, a person skilled in the art can configure the trigger clock to which the gate of the T11 is connected according to actual requirements.

The pull-down unit 213 is used to promptly pull down a source potential and a gate potential of the sixth TFT T61 to a low level, that is, to turn off the scan signal G (1) of the first row. Specifically, the pull-down unit 213 includes a seventh TFT T71 and an eighth TFT T81, wherein the T81 is used to pull down the potential of the scan signal G (1) of the first row, and a drain of the T81 is connected to the output terminal of the output unit 212, i.e., acts on the scan line G (1) of the first row. The T71 is used to pull down the scan control signal Q (1) of the first row, so as to turn off the sixth TFT T61. A drain of the T71 is connected to the control terminal of the output unit 212. A gate of the T71 is connected to a gate of the T81 and to a scan line G (2) of a second row, i.e., to receive a scan signal G (2) of the second row. The scan signal G (1) of the first row is deactivated under the control of effective scan signal G (2) of the second row, so as to achieve row-by-row scanning. A source of the T71 and a source of the T81 are connected to a DC low-voltage VSS together.

Moreover, since the structures of all the GOA drive units 210 following the first-stage GOA drive unit 210 are the same, the structure of a $w^{th}$-stage GOA drive unit 210 will be described below as an example to explain the structures of the GOA drive units 210 following the first-stage GOA drive unit 210, wherein w is an integer satisfying 1<w≤M, and M is the number of the GOA drive units. The main structure of the $w^{th}$-stage GOA drive unit 210 includes a trigger unit 211, an output unit 212, and a pull-down unit 213.

The trigger unit 211 is mainly used to control active time of the output unit 212, so as to realize row-by-row scan of the liquid crystal display panel. Specifically, the trigger unit 211 includes a TFT T51, for outputting a scan control signal Q (w) of a $w^{th}$ row. The T51 has a gate and a drain connected to each other, for receiving a scan signal G (w−1) output from a previous-stage GOA drive unit, and a source to generate a scan control signal Q (w) of the $w^{th}$ row. The source of the T51 is connected to a control terminal of the output unit 212.

The output unit 212 is mainly used to output a $q^{th}$ CK signal CK (q) as a scan signal G (w) of the $w^{th}$ row, wherein q=mod (w, H). The mod function is a residual function that returns the remainder from the division of two numeric parameters, wherein w is the dividend, and H is the divisor. It is to be noted that in the present embodiment, when H is exactly divisible by w, let q=H, i.e., the output unit 212 is used at this moment to output an $H^{th}$ CK signal CK (H) as the scan signal G (w) of the $w^{th}$ row. Specifically, the output unit 212 includes a sixth TFT T61 and a bootstrap capacitor C. A gate of the T61, as the control terminal of the output unit 212, receives the scan control signal Q (w) of the $w^{th}$ row generated by the trigger unit 211. A drain of the T61, as an input terminal of the output unit 212, receives the $q^{th}$ CK signal CK (q). A source of the T61, as an output terminal of the output unit 212, connects to a gate line G (w) of the $w^{th}$ row, for generating and outputting the scan signal G (w) of the $w^{th}$ row. The bootstrap capacitor C has one terminal connected to the gate of the T61, and another terminal connected to the source of the T61. The bootstrap capacitor C is used to store a voltage of the gate and the source of the T61 when Q (w) is high, and to lift the voltage of the gate of the T61 for a second time after G (w) outputs the scan signal G (w) of the $w^{th}$ row (i.e., when the scan clock CK (q) of this stage is high, a potential at the scan control signal point Q (w) of the $w^{th}$ row is lifted by a coupling effect of the bootstrap capacitor C), such that the T61 can be reliably started to output the scan signal G (w) of the $w^{th}$ row.

The pull-down unit 213 is used to promptly pull down the source potential and the gate potential of the sixth TFT T61 to a low level, that is, to turn off the scan signal G (w) of the $w^{th}$ row. Specifically, the pull-down unit 213 includes a seventh TFT T71 and an eighth TFT T81, wherein the T81 is used to pull down the potential of the scan signal G (w) of the $w^{th}$ row, and a drain of the T81 is connected to the output terminal of the output unit 212, i.e., acts on the scan line G (w) of the $w^{th}$ row. The T71 is used to pull down the scan control signal Q (w) of the $w^{th}$ row, so as to turn off the sixth TFT T61. A drain of the T71 is connected to the control terminal of the output unit 212. A gate of the T71 is connected to a gate of the T81 and to a scan line G (w+1) of a (w+1)$^{th}$ row, i.e., to receive a scan signal G (w+1) of the (w+1)$^{th}$ row. Effective scan signal G (w+1) of the (w+1)$^{th}$ row controls deactivation of the scan signal G (w) of the $w^{th}$ row, so as to achieve row-by-row scanning. A source of the T71 and a source of the T81 are connected together to a DC low-voltage VSS.

To conclude the above, when the first CK signal CK (1) is at a high potential, the GOA drive circuit 200 of the present embodiment can be used to lift the potential of the scan control signal point Q (1) in the first row under the coupling effect of the bootstrap capacitor C, so that the scan line G (1) of the first row can be prevented from being poorly charged due to late deactivation of the STV. The GOA drive circuit 200 of the present embodiment can be used to alleviate a poor charging condition of the scan line G (1) of the first row, thereby improving quality of a display screen.

Embodiment 2

Figure 2:
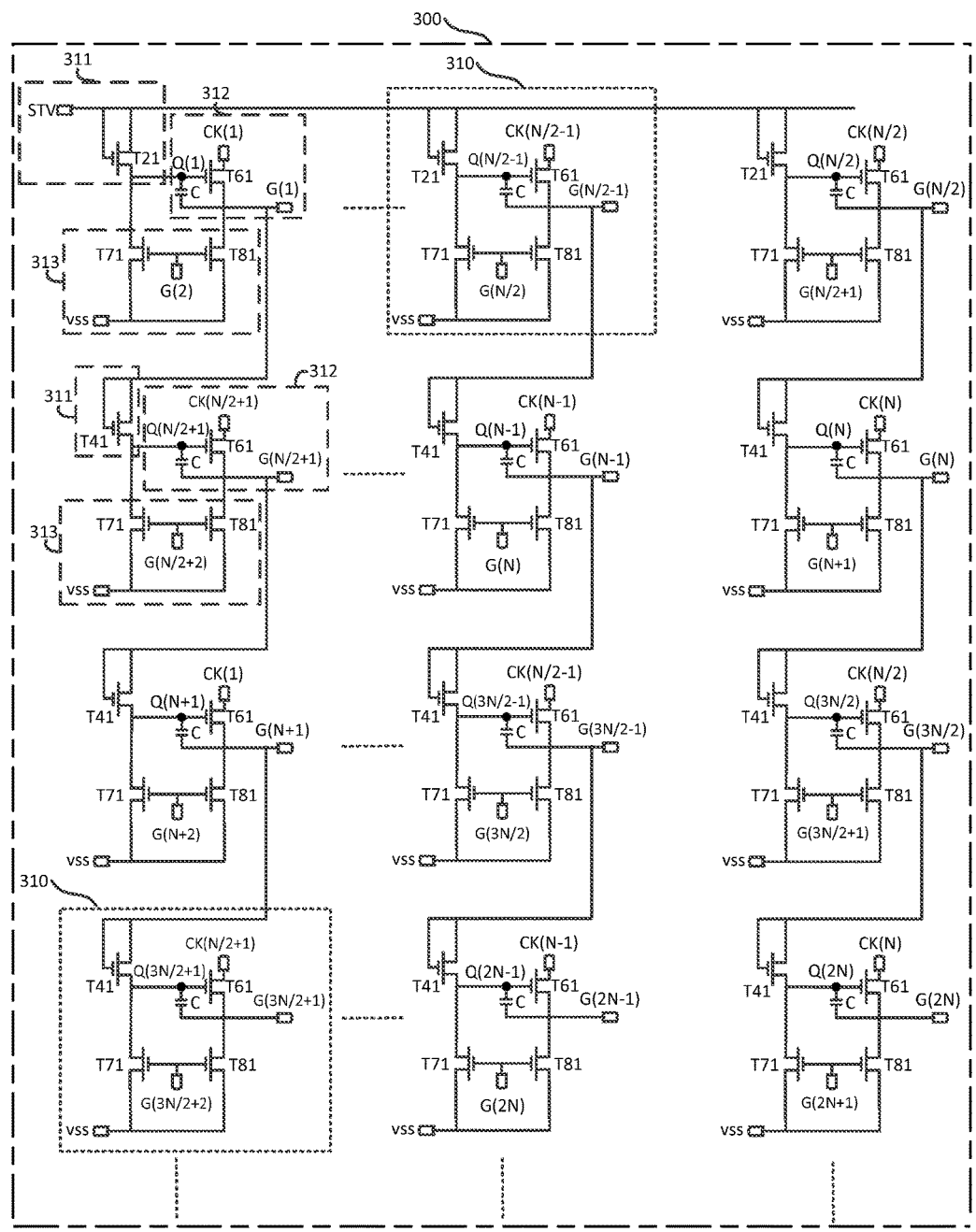
FIG. 2 schematically shows one structure of the GOA drive circuit having N scan clocks in an embodiment of the present disclosure.

In the present embodiment as shown in FIG. 2, the structure of a GOA drive circuit is improved in response of the problem in the prior art that an output signal of the GOA drive circuit is significantly attenuated when excessive GOA drive units are cascaded in the GOA drive circuit. FIG. 2 schematically shows the structure of a GOA drive circuit 300 of the present embodiment. The GOA drive circuit 300 is provided with N CK signals, wherein N is an integer larger than zero. The GOA drive circuit 300 includes a plurality of GOA drive units 310. Trigger units 311 of first N/2 GOA drive units 310 are triggered by STV, and an output signal of an $m^{th}$ GOA drive unit 310 serves as a trigger signal of an (m+N/2)$^{th}$ drive unit 310, wherein m is an integer satisfying 0<m≤M, M being the number of the GOA drive units. The GOA drive circuit 300 described above can solve the problem of significant attenuation of the output signal due to the excessively cascaded GOA drive units. However, in the above GOA drive circuit 300, since when first N/2−1 CKs are at a high potential, the STV is always at a high level, the potential at the scan control signal point Q (i.e., scan control signal output by each of the first N/2−1 trigger units 311) in each of the first N/2−1 GOA drive units 310 is prevented from being lifted under the action of the coupling effect of the bootstrap capacitor C, but only maintained at a same potential as the STV. This causes poor charging of first N/2−1 scan lines (i.e., the output signals of first N/2−1 output units 312) are poorly charged, thereby deteriorating the quality of the display screen. Therefore, based on the structure of the GOA drive circuit 300 shown in FIG. 2, an improved GOA drive circuit 400 is provide in the present disclosure, to alleviate poor charging conditions of the first $N/2-1$ scan lines and thereby improve the quality of the display screen.

Figure 3:
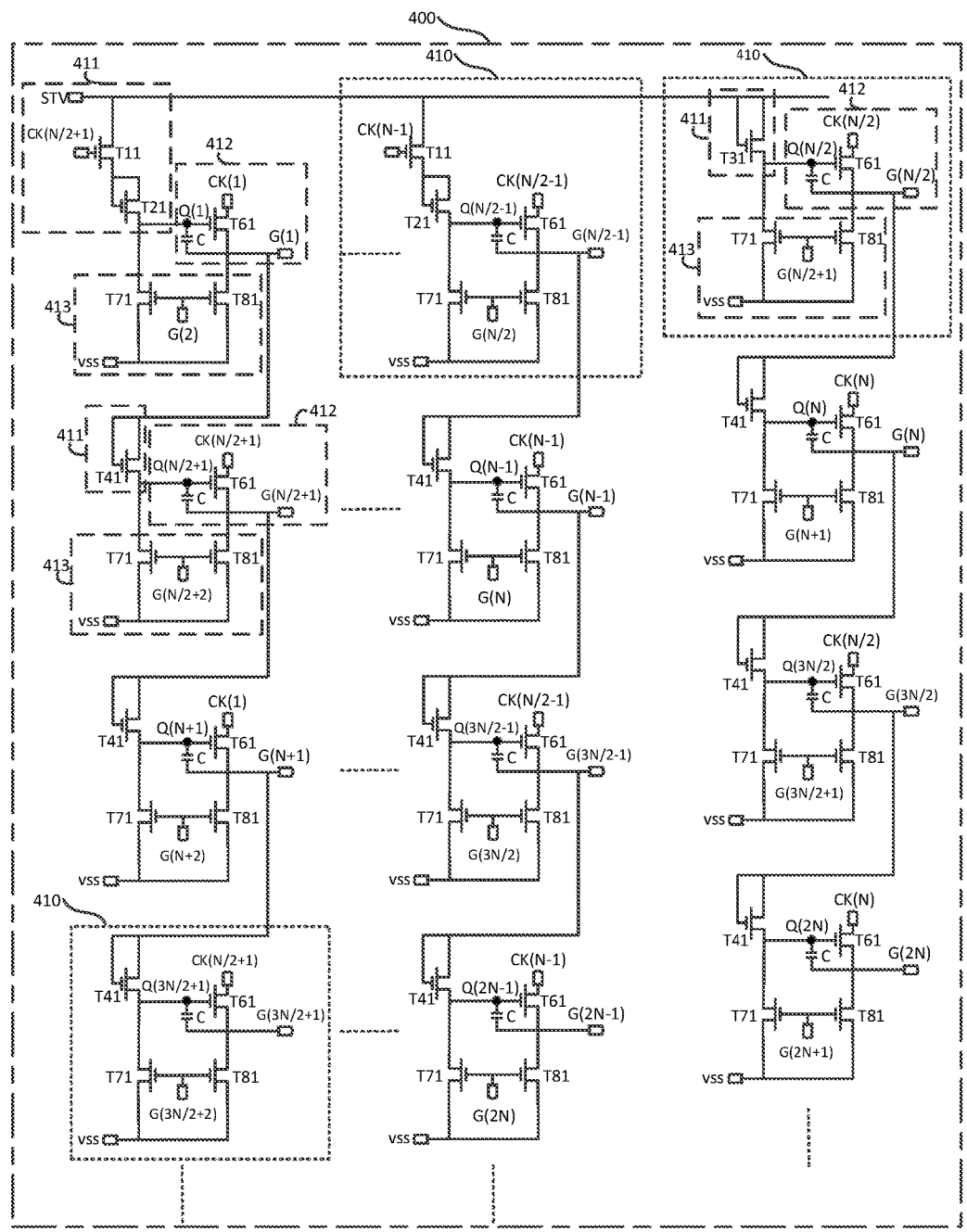
FIG. 3 schematically shows another structure of a GOA drive circuit having N scan clocks in the embodiment of the present disclosure.

FIG. 3 schematically shows the structure of the GOA drive circuit 400 having N CKs in the embodiment of the present disclosure. As shown in FIG. 3, the drive circuit 400 includes a plurality of GOA drive units 410. Specifically, trigger signals of first $N/2-1$ GOA drive units 410 are generated under the control of trigger clocks; the trigger signal of an $(N/2)^{th}$ GOA drive unit 410 is an STV; and an output signal of an $m^{th}$ GOA drive unit 410 is a trigger signal of an $(m+N/2)^{th}$ GOA drive unit 410. The specific structure of the drive circuit 400 will be described below in detail with reference to FIG. 3.

At the outset, since the structures of first K GOA drive units 410 are the same, the structure of a $k^{th}$ GOA drive unit 410 will be described below as an example to explain the structures of the first K GOA drive units 410, wherein K is an integer larger than zero and satisfying $1<k\leq K$, and $K=N/2-1$. The main structure of the $k^{th}$ GOA drive unit 410 includes a trigger unit 411, an output unit 412, and a pull-down unit 413.

The trigger unit 411 is mainly used to control active time of the output unit 412, so as to realize row-by-row scan of a liquid crystal display panel. Specifically, the trigger unit 411 includes a first TFT T11 and a second TFT T21, wherein the T11 is used for outputting the STV as a trigger signal. The T11 has a gate connected to a trigger clock, a drain connected to the STV, and a source for generating the trigger signal. And the source of the T11 is connected to a gate and a drain of the T21. T21 is used to output a scan control signal Q (k) of a $k^{th}$ row. The gate and the drain of the T21 are connected together, to receive the trigger signal generated by the source of the T11, and the source of the T21 generates the scan control signal Q (k) of the $k^{th}$ row. The source of the T21 is connected to a control terminal of the output unit 412.

The output unit 412 is mainly used to output a $k^{th}$ CK signal CK (k) as a scan signal G (k) of the $k^{th}$ row. Specifically, the output unit 412 includes a sixth TFT T61 and a bootstrap capacitor C. A gate of the T61, as the control terminal of the output unit 412, receives the scan control signal Q (k) of the $k^{th}$ row generated by the trigger unit 411. A drain of the T61, as an input terminal of the output unit 412, receives the $k^{th}$ CK signal CK (k). A source of the T61, as an output terminal of the output unit 412, connects to a gate line G (k) of the $k^{th}$ row, for generating and outputting the scan signal G (k) of the $k^{th}$ row. The bootstrap capacitor C has one terminal connected to the gate of the T61, and another terminal connected to the source of the T61. The bootstrap capacitor C is used to store a voltage of the gate and the source of the T61 when Q (k) is high, and to lift the voltage of the gate of the T61 for a second time after G (k) outputs the scan signal G (k) of the $k^{th}$ row (i.e., when CK (k) is high, a potential at the scan control signal point Q (k) of the $k^{th}$ row is lifted by a coupling effect of the bootstrap capacitor C), such that the T61 can be reliably started to output the scan signal G (k) of the $k^{th}$ row.

In the present embodiment, the trigger clock connected to the gate of the T11 is configured to turn off the trigger unit 411 when the CK signal CK (k) received by the input terminal of the output unit 412 is high. Specifically, during a period before the CK signal CK (k) varies from a low potential to a high potential, the trigger clock controls the trigger unit 411 in an active state, while during a period when the CK signal CK (k) varies from the low potential to the high potential and is kept high, the trigger clock controls the trigger unit 411 in an inactive state.

Further, during the period before the CK signal CK (k) varies from the low potential to the high potential, the trigger clock controls the T11 in an active state, while during the period when the CK signal CK (k) varies from the low potential to the high potential and is kept high, the trigger clock controls the T11 in an inactive state.

In the present embodiment, the T11 and the T21 are preferably N-type thin film transistors. Thus, at the outset, during the period before the CK signal CK (k) varies from the low potential to the high potential, the trigger clock is kept high so as to turn on the T11 to generate the trigger signal, thereby enabling the T21, after receiving the trigger signal at its gate and drain, to be turned on and generate the scan control signal Q (k) of the $k^{th}$ row. Next, during the period when the scan clock CK (k) varies from the low potential to the high potential and remains at the high potential, the trigger clock is kept low so as to turn off the T11. As a result, the potential of the point Q (k) can be lifted under the coupling effect of the bootstrap capacitor C when the CK (k) is at the high potential. Therefore, the first TFT T11 can be added according to the present embodiment, so as to prevent the scan line G (k) of the $k^{th}$ row from being poorly charged due to late deactivation of the STY.

In the present embodiment, in order to enable simple and convenient control, the trigger clock to which the gate of the T11 is connected is preferably configured to be a $(k+N/2)^{th}$ scan clock CK (k+N/2). Of course, it is also possible to separately set one clock signal as the trigger clock to which the gate of T11 is connected, as long as the clock signal can control the trigger unit 411 in an active state during a period before the scan clock CK (k) of the output unit 412 varies from the low potential to the high potential, and can control the trigger unit 411 in an inactive state during a period when the scan clock CK (k) of the output unit 412 varies from the low potential to the high potential and maintains the high potential. Therefore, in a specific implementing procedure, a person skilled in the art can arrange the trigger clock to which the gate of the T11 is connected according to actual requirements.

The pull-down unit 413 is used to promptly pull down the source potential and the gate potential of the sixth TFT T61 to a low level, that is, to turn off the scan signal G (k) of the $k^{th}$ row. Specifically, the pull-down unit 413 includes a seventh TFT T71 and an eighth TFT T81, wherein the T81 is used to pull down the potential of the scan signal G (k) of the $k^{th}$ row, and a drain of the T81 is connected to the output terminal of the output unit 412, i.e., acts on the scan line G (k) of the $k^{th}$ row. The T71 is used to pull down the scan control signal Q (k) of the $k^{th}$ row, so as to turn off the sixth TFT T61. A drain of the T71 is connected to the control terminal of the output unit 412. A gate of the T71 is connected to a gate of the T81 and to a scan line G (k+1) of a $(K+1)^{th}$ row, i.e., to receive a scan signal G (k+1) of the $(k+1)^{th}$ row. Effective scan signal G (K+1) of the $(k+1)^{th}$ row controls deactivation of the scan signal G (k) of the $k^{th}$ row, so as to achieve row-by-row scanning. A source of the T71 and a source of the T81 are connected to a DC low-voltage VSS together.

Next, the configuration of the $(K+1)^{th}$ GOA drive unit 410 will be described. The main structure of the $(K+1)^{th}$ GOA drive unit 410 includes a trigger unit 411, an output unit 412, and a pull-down unit 413.

The trigger unit 411 is mainly used to control active time of the output unit 412, so as to realize row-by-row scan of the liquid crystal display panel. Specifically, the trigger unit 411 includes a third TFT T31, for outputting a scan control signal Q (K+1) of a (K+1)$^{th}$ row. The T31 has a gate and a drain connected to an STV, and a source to generate a scan control signal Q (K+1) of the (K+1)$^{th}$ row. The source of the T31 is connected to a control terminal of the output unit 412.

The output unit 412 is mainly used to output a (K+1)$^{th}$ CK signal CK (K+1) as a scan signal G (K+1) of the (K+1)$^{th}$ row. Specifically, the output unit 412 includes a sixth TFT T61 and a bootstrap capacitor C. A gate of the T61, as the control terminal of the output unit 412, receives the scan control signal Q (K+1) of the (K+1)$^{th}$ row generated by the trigger unit 411. A drain of the T61, as an input terminal of the output unit 412, receives the (K+1)$^{th}$ CK signal CK (K+1). A source of the T61, as an output terminal of the output unit 412, connects to a gate line G (K+1) of the (K+1)$^{th}$ row, for generating and outputting the scan signal G (K+1) of the (K+1)$^{th}$ row. The bootstrap capacitor C has one terminal connected to the gate of the T61, and another terminal connected to the source of the T61. The bootstrap capacitor C is used to store a voltage of the gate and the source of the T61 when Q (K+1) is high, and to lift the voltage of the gate of the T61 for a second time after G (K+1) outputs the scan signal G (K+1) of the (K+1)$^{th}$ row (i.e., when CK (K+1) is high, a potential at the scan control signal point Q (K+1) of the (K+1)$^{th}$ row is lifted by a coupling effect of the bootstrap capacitor C), such that the T61 can be reliably started to output the scan signal G (K+1) of the (K+1)$^{th}$ row.

The pull-down unit 413 is used to promptly pull down the source potential and the gate potential of the sixth TFT T61 to a low level, that is, to turn off the scan signal G (K+1) of the (K+1)$^{th}$ row. Specifically, the pull-down unit 413 includes a seventh TFT T71 and an eighth TFT T81, wherein the T81 is used to pull down the potential of the scan signal G (K+1) of the (K+1)$^{th}$ row, and a drain of the T81 is connected to the output terminal of the output unit 412, i.e., acts on the scan line G (K+1) of the (K+1)$^{th}$ row. The T71 is used to pull down the scan control signal Q (K+1) of the (K+1)$^{th}$ row, so as to turn off the sixth TFT T61. A drain of the T71 is connected to the control terminal of the output unit 412. A gate of the T71 is connected to a gate of the T81 and to a scan line G (K+2) of a (K+2)$^{th}$ row, i.e., to receive a scan signal G (K+2) of the (K+2)$^{th}$ row. Effective scan signal G (K+2) of the (K+2)$^{th}$ row controls deactivation of the scan signal G (K+1) of the (K+1)$^{th}$ row, so as to achieve row-by-row scanning. A source of the T71 and a source of the T81 are connected together to a DC low-voltage VSS.

In the end, since the structures of all the GOA drive units 410 following the (K+1)$^{th}$ GOA drive unit 410 are the same, the structure of an f$^{th}$ GOA drive unit 410 will be described below as an example to explain the structures of the GOA drive units 410 following the (K+1)$^{th}$ GOA drive unit 410, wherein f is an integer satisfying K+1<f≤M. The main structure of the f$^{th}$ GOA drive unit 410 includes a trigger unit 411, an output unit 412, and a pull-down unit 413.

The trigger unit 411 is mainly used to control active time of the output unit 412, so as to realize row-by-row scan of the liquid crystal display panel. Specifically, the trigger unit 411 includes a fourth TFT T41, for outputting a scan control signal Q (f) of an f$^{th}$ row. The T41 has a gate and a drain connected to each other, for receiving a scan signal G (f−N/2) of an (f−N/2)$^{th}$ row output from an (f−N/2)$^{th}$ GOA drive unit, and a source to generate a scan control signal Q (f) of the f$^{th}$ row. The source of the T41 is connected to a control terminal of the output unit 412.

The output unit 412 is mainly used to output an e$^{th}$ CK signal CK (e) as a scan signal G (f) of the f$^{th}$ row, wherein e=mod (f, N). It is to be noted that in the present embodiment, when N is exactly divisible by f, let e=N, i.e., the output unit 412 is used at this moment to output an N$^{th}$ scan clock signal CK (N) as the scan signal G (f) of the f$^{th}$ row. Specifically, the output unit 412 includes a sixth TFT T61 and a bootstrap capacitor C. A gate of the T61, as the control terminal of the output unit 412, receives the scan control signal Q (f) of the f$^{th}$ row generated by the trigger unit 411. A drain of the T61, as an input terminal of the output unit 412, receives the e$^{th}$ CK signal CK (e). A source of the T61, as an output terminal of the output unit 412, connects to a gate line G (f) of the f$^{th}$ row, for generating and outputting the scan signal G (f) of the f$^{th}$ row. The bootstrap capacitor C has one terminal connected to the gate of the T61, and another terminal connected to the source of the T61. The bootstrap capacitor C is used to store a voltage of the gate and the source of the T61 when Q (f) is high, and to lift the voltage of the gate of the T61 for a second time after G (f) outputs the scan signal G (f) of the f$^{th}$ row (i.e., when the scan clock CK (e) of the f$^{th}$ GOA drive unit 410 is high, a potential at the scan control signal point Q (f) of the f$^{th}$ row is lifted by a coupling effect of the bootstrap capacitor C), such that the T61 can be reliably started to output the scan signal G (f) of the f$^{th}$ row.

The pull-down unit 413 is used to promptly pull down the source potential and the gate potential of the sixth TFT T61 to a low level, that is, to turn off the scan signal G (f) of the f$^{th}$ row. Specifically, the pull-down unit 413 includes a seventh TFT T71 and an eighth TFT T81, wherein the T81 is used to pull down the potential of the scan signal G (f) of the f$^{th}$ row, and a drain of the T81 is connected to the output terminal of the output unit 412, i.e., acts on the scan line G (f) of the f$^{th}$ row. The T71 is used to pull down the scan control signal Q (f) of the f$^{th}$ row, so as to turn off the sixth TFT T61. A drain of the T71 is connected to the control terminal of the output unit 412. A gate of the T71 is connected to a gate of the T81 and to a scan line G (f+1) of an (f+1)$^{th}$ row, i.e., to receive a scan signal G (f+1) of the (f+1)$^{th}$ row. Effective scan signal G (f+1) of the (f+1)$^{th}$ row controls deactivation of the scan signal G (f) of the f$^{th}$ row, so as to achieve row-by-row scanning. A source of the T71 and a source of the T81 are connected together to a DC low-voltage VSS.

To conclude the above, when the first N/2−1 scan clocks are at a high potential, the GOA drive circuit 400 of the present embodiment can be used to lift the potential of the scan control signal points Q in the first N/2−1 rows under the coupling effect of the bootstrap capacitor C, so that the scan lines of the first N/2−1 rows can be prevented from being poorly charged due to late deactivation of the STV. The GOA drive circuit 400 of the present embodiment can be used to alleviate poor charging conditions of the scan lines of the first N/2−1 rows, thereby improving quality of a display screen.

Embodiment 3

In the present embodiment, the number of scan clocks in the Embodiment 2 is further optimized.

Figure 4:
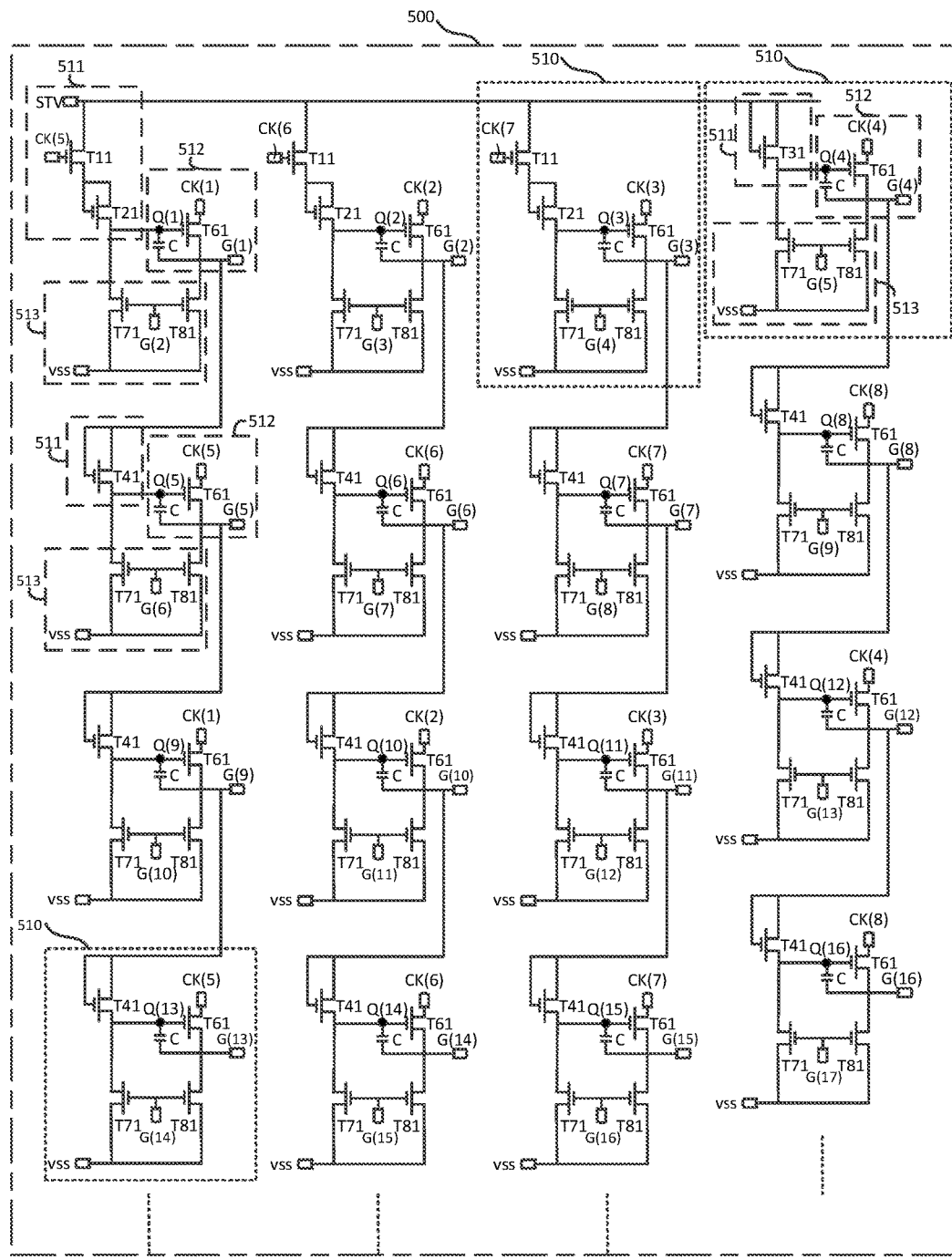
FIG. 4 schematically shows a structure of a GOA drive circuit having 8 scan clocks in an embodiment of the present disclosure.

On the basis of Embodiment 2, the number of the scan clocks is further defined in the present embodiment. Preferably, the number of the scan clocks is N=8, as shown in FIG. 4, which schematically indicates the structure of a GOA drive circuit 500 having 8 scan clocks in the present embodiment of the present disclosure. As shown in FIG. 4, the GOA drive circuit 500 includes a plurality of GOA drive units 510. Specifically, trigger signals of first three GOA drive units 510 are generated under the control of trigger clocks. A trigger signal of a fourth GOA drive unit 510 is an STV. An output signal of an $m^{th}$ GOA drive unit 510 is a trigger signal of an $(m+4)^{th}$ GOA drive unit 510. The specific structure of the drive circuit 500 will be described in detail with reference to FIG. 4 in the following.

At the outset, since the structures of first three GOA drive units 510 are the same, the structure of a $k^{th}$ GOA drive unit 510 will be described below as an example to explain the structures of the first three GOA drive units 510, wherein k is an integer satisfying 0<k≤3. The main structure of the $k^{th}$ GOA drive unit 510 includes a trigger unit 511, an output unit 512, and a pull-down unit 513.

The trigger unit 511 is mainly used to control active time of the output unit 512, so as to realize row-by-row scan of a liquid crystal display panel. Specifically, the trigger unit 511 includes a first TFT T11 and a second TFT T21. The T11 is used to output an STV as a trigger signal. The T11 has a gate connected to a trigger clock, a drain connected to the STV, and a source used to generate the trigger signal. A source of the T11 is connected to a gate and a drain of the T21, which is used to output a scan control signal Q (k) of a $k^{th}$ row. The gate and the drain of the T21 are connected to each other, for receiving the trigger signal generated by the source of the T11, and a source of the T21 is used to generate the scan control signal Q (k) of the $k^{th}$ row. The source of the T21 is connected to a control terminal of the output unit 512.

The output unit 512 is mainly used to output a $k^{th}$ CK signal CK (1) as a scan signal G (k) of the $k^{th}$ row. Specifically, the output unit 512 includes a sixth TFT T61 and a bootstrap capacitor C. A gate of the T61, as the control terminal of the output unit 512, receives the scan control signal Q (K) of the $k^{th}$ row generated by the trigger unit 511. A drain of the T61, as an input terminal of the output unit 512, receives the $k^{th}$ CK signal CK (k). A source of the T61, as an output terminal of the output unit 512, connects to a gate line G (k) of the $k^{th}$ row, for generating and outputting the scan signal G (k) of the $k^{th}$ row. The bootstrap capacitor C has one terminal connected to the gate of the T61, and another terminal connected to the source of the T61. The bootstrap capacitor C is used to store a voltage of the gate and the source of the T61 when Q (k) is high, and to lift the voltage of the gate of the T61 for a second time after G (k) outputs the scan signal G (k) of the $k^{th}$ row (i.e., when CK (k) is high, a potential at the scan control signal point Q (k) of the $k^{th}$ row is lifted by a coupling effect of the bootstrap capacitor C), such that the T61 can be reliably started to output the scan signal G (k) of the $k^{th}$ row.

In the present embodiment, the trigger clock connected to the gate of the T11 is configured to turn off the trigger unit 511 when the CK signal CK (k) received by the input terminal of the output unit 512 is high. Specifically, during a period before the CK signal CK (k) varies from a low potential to a high potential, the trigger clock controls the trigger unit 511 in an active state, while during a period when the CK signal CK (k) varies from the low potential to the high potential and is kept high, the trigger clock controls the trigger unit 511 in an inactive state.

Further, during the period before the CK signal CK (k) varies from the low potential to the high potential, the trigger clock controls the T11 in an active state, while during the period when the CK signal CK (k) varies from the low potential to the high potential and is kept high, the trigger clock controls the T11 in an inactive state.

In the present embodiment, the T11 and the T21 are preferably N-type thin film transistors. Thus, at the outset, during the period before the CK signal CK (k) varies from the low potential to the high potential, the trigger clock is kept high so as to turn on the T11 to generate the trigger signal, thereby enabling the T21, after receiving the trigger signal at its gate and drain, to be turned on and generate the scan control signal Q (k) of the $k^{th}$ row. Next, during the period when the CK signal CK (k) varies from the low potential to the high potential and remains at the high potential, the trigger clock is kept low so as to turn off the T11. As a result, the potential of the point Q (k) can be lifted under the coupling effect of the bootstrap capacitor C when the CK (k) is high. Therefore, the first thin film transistor T11 controlled by the trigger clock can be added according to the present embodiment, so as to prevent the scan line G (k) of the $k^{th}$ row from being poorly charged due to late deactivation of the STV.

In the present embodiment, in order to enable simple and convenient control, the trigger clock to which the gate of the T11 is connected is preferably configured to be a $(k+4)^{th}$ scan clock CK (k+4). Of course, it is also possible to separately set one clock signal as the trigger clock to which the gate of T11 is connected, as long as the clock signal can control the trigger unit 511 in an active state during a period before the scan clock CK (k) of the output unit 512 varies from the low potential to the high potential, and can control the trigger unit 511 in an inactive state during a period when the scan clock CK (k) of the output unit 512 varies from the low potential to the high potential and maintains the high potential. Therefore, in a specific implementing procedure, a person skilled in the art can arrange the trigger clock to which the gate of the T11 is connected according to actual requirements.

The pull-down unit 513 is used to promptly pull down the source potential and the gate potential of the sixth TFT T61 to a low level, that is, to turn off the scan signal G (k) of the $k^{th}$ row. Specifically, the pull-down unit 513 includes a seventh TFT T71 and an eighth TFT T81, wherein the T81 is used to pull down the potential of the scan signal G (k) of the $k^{th}$ row, and a drain of the T81 is connected to the output terminal of the output unit 512, i.e., acts on the scan line G (k) of the $k^{th}$ row. The T71 is used to pull down the scan control signal Q (k) of the $k^{th}$ row, so as to turn off the sixth TFT T61. A drain of the T71 is connected to the control terminal of the output unit 512. A gate of the T71 is connected to a gate of the T81 and to a scan line G (k+1) of a $(k+1)^{th}$ row, i.e., to receive a scan signal G (k+1) of the (k+1)th row. Effective scan signal G (k+1) of the $(k+1)^{th}$ row controls deactivation of the scan signal G (k) of the $k^{th}$ row, so as to achieve row-by-row scanning. A source of the T71 and a source of the T81 are connected to a DC low-voltage VSS together.

Next, the configuration of the fourth GOA drive unit 510 will be described. The main structure of the fourth GOA drive unit 510 includes a trigger unit 511, an output unit 512, and a pull-down unit 513.

The trigger unit 511 is mainly used to control active time of the output unit 512, so as to realize row-by-row scan of the liquid crystal display panel. Specifically, the trigger unit 511 includes a third TFT T31, for outputting a scan control signal Q (4) of a fourth row. The T31 has a gate and a drain connected to the STV, and a source to generate a scan control signal Q (4) of the fourth row. The source of the T31 is connected to a control terminal of the output unit 512.

The output unit 512 is mainly used to output a fourth CK signal CK (4) as a scan signal G (4) of the fourth row.

Specifically, the output unit 512 includes a sixth TFT T61 and a bootstrap capacitor C. A gate of the T61, as the control terminal of the output unit 512, receives the scan control signal Q (4) of the fourth row generated by the trigger unit 511. A drain of the T61, as an input terminal of the output unit 512, receives the fourth CK signal CK (4). A source of the T61, as an output terminal of the output unit 512, connects to a gate line G (4) of the fourth row, for generating and outputting the scan signal G (4) of the fourth row. The bootstrap capacitor C has one terminal connected to the gate of the T61, and another terminal connected to the source of the T61. The bootstrap capacitor C is used to store a voltage of the gate and the source of the T61 when Q (4) is high, and to lift the voltage of the gate of the T61 for a second time after G (4) outputs the scan signal G (4) of the fourth row (i.e., when CK (4) is high, a potential at the scan control signal point Q (4) of the fourth row is lifted by a coupling effect of the bootstrap capacitor C), such that the T61 can be reliably started to output the scan signal G (4) of the fourth row.

The pull-down unit 513 is used to promptly pull down the source potential and the gate potential of the sixth TFT T61 to a low level, that is, to turn off the scan signal G (4) of the fourth row. Specifically, the pull-down unit 513 includes a seventh TFT T71 and an eighth TFT T81, wherein the T81 is used to pull down the potential of the scan signal G (4) of the fourth row, and a drain of the T81 is connected to the output terminal of the output unit 512, i.e., acts on the scan line G (4) of the fourth row. The T71 is used to pull down the scan control signal Q (4) of the fourth row, so as to turn off the sixth TFT T61. A drain of the T71 is connected to the control terminal of the output unit 512. A gate of the T71 is connected to a gate of the T81 and to a scan line G (5) of a fifth row, i.e., to receive a scan signal G (5) of the fifth row. Effective scan signal G (5) of the fifth row controls deactivation of the scan signal G (4) of the fourth row, so as to achieve row-by-row scanning. A source of the T71 and a source of the T81 are connected together to a DC low-voltage VSS.

In the end, since the structures of all the GOA drive units 510 following the fourth GOA drive unit 510 are the same, the structure of the $f^{th}$ GOA drive unit 510 will be described below as an example to explain the structures of the GOA drive units 510 following the fourth GOA drive unit 510, wherein f is an integer satisfying 4<f≤M. The main structure of the $f^{th}$ GOA drive unit 510 includes a trigger unit 511, an output unit 512, and a pull-down unit 513.

The trigger unit 511 is mainly used to control active time of the output unit 512, so as to realize row-by-row scan of the liquid crystal display panel. Specifically, the trigger unit 511 includes a fourth TFT T41, for outputting a scan control signal Q (f) of an $f^{th}$ row. The T41 has a gate and a drain connected to each other, for receiving a scan signal G (f−4) of an (f−4)$^{th}$ row output from an (f−4)$^{th}$ GOA drive unit, and a source to generate a scan control signal Q (f) of the $f^{th}$ row. The source of the T41 is connected to a control terminal of the output unit 512.

The output unit 512 is mainly used to output an $e^{th}$ CK signal CK (e) as a scan signal G (f) of the $f^{th}$ row, wherein e=mod (f, 8). It is to be noted that in the present embodiment, when 8 is exactly divisible by f, let e=8, i.e., the output unit 512 is used at this moment to output an eighth scan clock signal CK (8) as the scan signal G (f) of the $f^{th}$ row. Specifically, the output unit 512 includes a sixth TFT T61 and a bootstrap capacitor C. A gate of the T61, as the control terminal of the output unit 512, receives the scan control signal Q (f) of the $f^{th}$ row generated by the trigger unit 511. A drain of the T61, as an input terminal of the output unit 512, receives the $e^{th}$ CK signal CK (e). A source of the T61, as an output terminal of the output unit 512, connects to a gate line G (f) of the $f^{th}$ row, for generating and outputting the scan signal G (f) of the $f^{th}$ row. The bootstrap capacitor C has one terminal connected to the gate of the T61, and another terminal connected to the source of the T61. The bootstrap capacitor C is used to store a voltage of the gate and the source of the T61 when Q (f) is high, and to lift the voltage of the gate of the T61 for a second time after G (f) outputs the scan signal G (f) of the $f^{th}$ row (i.e., when the scan clock CK (e) of the $f^{th}$ GOA drive unit 510 is high, a potential at the scan control signal point Q (f) of the $f^{th}$ row is lifted by a coupling effect of the bootstrap capacitor C), such that the T61 can be reliably started to output the scan signal G (f) of the $f^{th}$ row.

The pull-down unit 513 is used to promptly pull down the source potential and the gate potential of the sixth TFT T61 to a low level, that is, to turn off the scan signal G (f) of the $f^{th}$ row. Specifically, the pull-down unit 513 includes a seventh TFT T71 and an eighth TFT T81, wherein the T81 is used to pull down the potential of the scan signal G (f) of the $f^{th}$ row, and a drain of the T81 is connected to the output terminal of the output unit 512, i.e., acts on the scan line G (f) of the $f^{th}$ row. The T71 is used to pull down the scan control signal Q (f) of the $f^{th}$ row, so as to turn off the sixth TFT T61. A drain of the T71 is connected to the control terminal of the output unit 512. A gate of the T71 is connected to a gate of the T81 and to a scan line G (f+1) of an (f+1)$^{th}$ row, i.e., to receive a scan signal G (f+1) of the (f+1)$^{th}$ row. Effective scan signal G (f+1) of the (f+1)$^{th}$ row controls deactivation of the scan signal G (f) of the $f^{th}$ row, so as to achieve row-by-row scanning. A source of the T71 and a source of the T81 are connected together to a DC low-voltage VSS.

Figure 5:
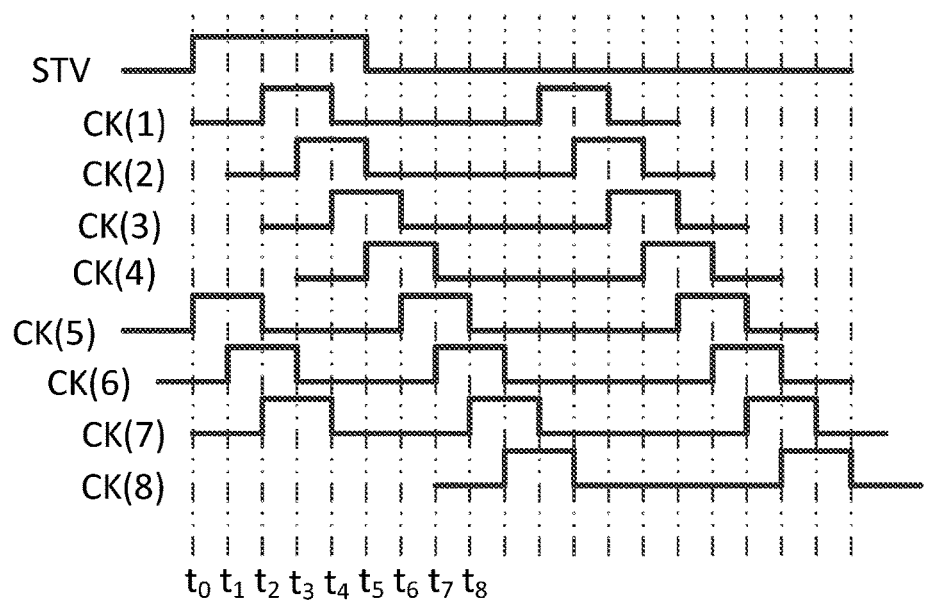
FIG. 5 is an operating timing diagram of the GOA drive circuit having eight scan clocks in the embodiment of the present disclosure.

In the present embodiment, all the thin film transistors described above are preferably N-type thin film transistors. Further, FIG. 5 provides an operating timing diagram of the GOA drive circuit 500. A driving procedure will be described in detail with reference to FIGS. 4 and 5.

During a period from t0 to t1, CK (5) and the STV are high, and the trigger unit 511 in the first GOA drive unit 510 is turned on and outputs the scan control signal Q (1) of the first row. Meanwhile, the STV is at a high level, the T31 in the fourth GOA drive unit 510 is turned on to output the scan control signal Q (4) of the fourth row.

During a period from t1 to t2, CK (6) and the STV are high, and the trigger unit 511 in the second GOA drive unit 510 is turned on and outputs the scan control signal Q (2) of the second row. At the same time, CK (5) and the STV are high, and the trigger unit 511 in the first GOA drive unit 510 is still active and outputs the scan control signal Q (1) of the first row. The STV is high, and the T31 in the fourth GOA drive unit 510 is still active and outputs the scan control signal Q (4) of the fourth row.

During a period from t2 to t3, first, CK (1) and Q (1) are high, and the T61 in the first GOA drive unit 510 is turned on and outputs the scan signal G (1) of the first row. At the same time, since CK (5) is low, the T11 in the first GOA drive unit 510 is turned off, so that the potential of the scan control signal Q (1) in the first row can be lifted by the coupling effect of the bootstrap capacitor C. As a result, the scan signal G (1) of the first row can be sufficiently charged. Moreover, after the scan signal G (1) of the first row is output, the T41 in the fifth GOA drive unit 510 is turned on and outputs the scan control signal Q (5) of the fifth row. Second, CK (7) and the STV are high, and the trigger unit

511 in the third GOA drive unit 510 is turned on and outputs the scan control signal Q (3) of the third row. Third, CK (6) and the STV are high, and the trigger unit 511 in the second GOA drive unit 510 is still active and outputs the scan control signal Q (2) of the second row. The STV is high, and the T31 in the fourth GOA drive unit 510 is still active and outputs the scan control signal Q (4) of the fourth row.

During a period from t3 to t4, first, CK (2) and Q (2) are high, and the T61 in the second GOA drive unit 510 is turned on and outputs the scan signal G (2) of the second row. At the same time, since the CK (6) is low, the T11 in the second GOA drive unit 510 is turned off, so that the potential of the scan control signal Q (2) in the second row can be lifted by the coupling effect of the bootstrap capacitor C. As a result, the scan signal G (2) of the second row is sufficiently charged. Moreover, when the scan signal G (2) of the second row is output, on the one hand, the T71 and the T81 in the first GOA drive unit 510 are turned on, and G (1) and Q (1) are pulled low, to turn off the scan line G (1) of the first row of pixels. On the other hand, the T41 in the sixth GOA drive unit 510 is turned on and outputs the scan control signal Q (6) of the sixth row. Second, CK (7) and the STV are high, and the trigger unit 511 in the third GOA drive unit 510 is still active and outputs the scan control signal Q (3) of the third row. The STV is high, and the T31 in the fourth GOA drive unit 510 is still active and outputs the scan control signal Q (4) of the fourth row.

During a period from t4 to t5, first, CK (3) and Q (3) are high, and the T61 in the third GOA drive unit 510 is turned on and outputs the scan signal G (3) of the third row. At the same time, since the CK (7) is low, the T11 in the third GOA drive unit 510 is turned off, so that the potential of the scan control signal Q (3) of the third row can be lifted by the coupling effect of the bootstrap capacitor C. As a result, the scan signal G (3) of the third row is sufficiently charged. Moreover, after the scan signal G (3) of the third row is output, on the one hand, the T71 and the T81 in the second GOA drive unit 510 are turned on, and G (2) and Q (2) are pulled low, to turn off the scan line G (2) of the second row of pixels. On the other hand, the T41 in the seventh GOA drive unit 510 is turned on, and outputs the scan control signal Q (7) of the seventh row. Second, the STV is high, and the T31 in the fourth GOA drive unit 510 is still active and outputs the scan control signal Q (4) of the fourth row.

During a period from t5 to t6, CK (4) and Q (4) are high, and the T61 in the fourth GOA drive unit 510 is turned on and outputs the scan signal G (4) of the fourth row. At the same time, since the STV is low, the T31 in the fourth GOA drive unit 510 is turned off, so that the potential of the scan control signal Q (4) in the fourth row can be lifted by the coupling effect of the bootstrap capacitor C. As a result, the scan signal G (4) of the fourth row is sufficiently charged. Moreover, when the scan signal G (4) of the fourth row is output, on the one hand, the T71 and the T81 in the third GOA drive unit 510 are turned on, thereby pulling down G (3) and Q (3), and turning off the scan line G (3) of the third row of pixels. On the other hand, the T41 in the eighth GOA drive unit 510 is turned on and outputs the scan control signal Q (8) of the eighth row.

During a period from t6 to t7, CK (5) and Q (5) are high, and the T61 in the fifth GOA drive unit 510 is turned on and outputs the scan signal G (5) of the fifth row. Moreover, after the scan signal G (5) of the fifth row is output, on the one hand, the T71 and the T81 in the fourth GOA drive unit 510 are turned on, thereby pulling down G (4) and Q (4), and turning off the scan line G (4) of the fourth row of pixels. And on the other hand, the T41 in the ninth GOA drive unit 510 is turned on and outputs the scan control signal Q (9) of the ninth row.

During a period from t7 to t8, CK (6) and Q (6) are high, and the T61 in the sixth GOA drive unit 510 is turned on and outputs the scan signal G (6) of the sixth row. Moreover, after the scan signal G (6) of the sixth row is output, on the one hand, the T71 and the T81 in the fifth GOA drive unit 510 are turned on, thereby pulling down G (5) and Q (5) to a low level, and turning off the scan line G (5) of the fifth row of pixels. And on the other hand, the T41 in the tenth GOA drive unit 510 is turned on and outputs the scan control signal Q (10) of the tenth row.

Driving modes of the following rows of scan lines are similar to a drive mode as described above during the period from t7 to t8, and thus will not be repeated herein for the sake of convenience. Therefore, the GOA drive circuit 500 in the present embodiment realizes row-by-row scanning, and prevents an occurrence of poor charging of the first three rows of scan lines due to late deactivation of the STY.

To conclude the above, when the first three scan clocks are at a high potential, the GOA drive circuit 500 of the present embodiment can be used to lift the potential of the scan control signal points Q in the first three rows under the coupling effect of the bootstrap capacitor C, so that the scan lines of the first three rows can be prevented from being poorly charged due to late deactivation of the STY. The GOA drive circuit 500 of the present embodiment can be used to alleviate poor charging conditions of the scan lines of the first three rows, thereby improving quality of a display screen.

Embodiment 4

The present disclosure further provides a liquid crystal display panel. The liquid crystal display panel of the present embodiment includes the GOA drive circuit 200 described in Embodiment 1.

To conclude the above, when the first CK signal CK (1) is at a high potential, the liquid crystal display panel of the present embodiment can be used to lift the potential of the scan control signal point Q (1) in the first row under the coupling effect of the bootstrap capacitor C, so that the scan line G (1) of the first row can be prevented from being poorly charged due to late deactivation of the STY. The liquid crystal display panel of the present embodiment can be used to alleviate a poor charging condition of the scan line G (1) of the first row, thereby improving quality of a display screen.

Embodiment 5

The present disclosure further provides a liquid crystal display panel. The liquid crystal display panel of the present embodiment includes the GOA drive circuit 400 described in Embodiment 2 or the GOA drive circuit 500 described in Embodiment 3.

To conclude the above, when the first N/2−1 scan clocks are at a high potential, the liquid crystal display panel of the present embodiment can be used to lift the potential of the scan control signal points Q in the first N/2−1 rows under the coupling effect of the bootstrap capacitor C, so that the scan lines of the first N/2−1 rows can be prevented from being poorly charged due to late deactivation of the STY. The liquid crystal display panel of the present embodiment can

The invention claimed is:

1. A GOA drive circuit, comprising a plurality of GOA drive units, each GOA drive unit including a trigger unit and an output unit connected to each other,
wherein each trigger unit in first K GOA drive units comprises a first thin film transistor and a second thin film transistor,
wherein the first thin film transistor has a gate connected to a trigger clock corresponding to the trigger unit, a drain connected to a start vertical signal, and a source connected to a gate and a drain of the second thin film transistor, and a source of the second thin film transistor is connected to a control terminal of an output unit connected to the trigger unit, K being an integer larger than 0, and
wherein the trigger clock is configured to turn off the trigger unit when a scan clock of the output unit is at a high level;
wherein an output signal of an $m^{th}$ GOA drive unit is a trigger signal of an $(m+N/2)^{th}$ GOA drive unit, N being a number of scan clocks in the GOA drive circuit, and N=2(K+1);
wherein m is an integer satisfying 0<m≤M, M being a number of GOA drive units.

2. The GOA drive circuit according to claim 1, wherein a trigger unit in a $(K+1)^{th}$ GOA drive unit includes a third thin film transistor, which has a gate and a drain connected to the start vertical signal, and a source connected to a control terminal of an output unit in the $(K+1)^{th}$ GOA drive unit.

3. The GOA drive circuit according to claim 2, wherein a trigger unit in each GOA drive unit following the $(K+1)^{th}$ GOA drive unit includes a fourth thin film transistor, which has a gate and a drain connected to a trigger signal corresponding to the trigger unit, and a source connected to a control terminal of an output unit connected to the trigger unit.

4. The GOA drive circuit according to claim 3, wherein a trigger clock corresponding to a trigger unit of a $k^{th}$ GOA drive unit is a scan clock of an output unit in a $(k+N/2)^{th}$ GOA drive unit, k being an integer satisfying 0<k≤K.

5. The GOA drive circuit according to claim 4, wherein K equals 3.

6. The GOA drive circuit according to claim 2, wherein a trigger clock corresponding to a trigger unit of a $k^{th}$ GOA drive unit is a scan clock of an output unit in a $(k+N/2)^{th}$ GOA drive unit, k being an integer satisfying 0<k≤K.

7. The GOA drive circuit according to claim 6, wherein K equals 3.

8. The GOA drive circuit according to claim 1, wherein a trigger clock corresponding to a trigger unit of a $k^{th}$ GOA drive unit is a scan clock of an output unit in a $(k+N/2)^{th}$ GOA drive unit, k being an integer satisfying 0<k≤K.

9. The GOA drive circuit according to claim 8, wherein K equals 3.

10. The GOA drive circuit according to claim 1, wherein all GOA drive units included in the GOA drive circuit are connected in sequence; and
wherein an output signal of a previous-stage GOA drive unit is a trigger signal of its next-stage GOA drive unit, and K=1.

11. The GOA drive circuit according to claim 10, wherein a trigger clock corresponding to a trigger unit of a first-stage GOA drive unit is any one of H scan clocks except a scan clock of the first-stage GOA drive unit, H being number of scan clocks in the GOA drive circuit.

12. The GOA drive circuit according to claim 11, wherein a trigger unit in each GOA drive unit following the first-stage GOA drive unit includes a fifth thin film transistor, which has a gate and a drain connected to a trigger signal corresponding to the trigger unit, and a source connected to a control terminal of an output unit connected to the trigger unit.

13. The GOA drive circuit according to claim 10, wherein a trigger unit in each GOA drive unit following the first-stage GOA drive unit includes a fifth thin film transistor, which has a gate and a drain connected to a trigger signal corresponding to the trigger unit, and a source connected to a control terminal of an output unit connected to the trigger unit.

14. A liquid crystal display panel, comprising a GOA drive circuit, which includes a plurality of GOA drive units, each GOA drive unit having a trigger unit and an output unit connected to each other,
wherein each trigger unit in first K GOA drive units comprises a first thin film transistor and a second thin film transistor,
wherein the first thin film transistor has a gate connected to a trigger clock corresponding to the trigger unit, a drain connected to a start vertical signal, and a source connected to a gate and a drain of the second thin film transistor, and a source of the second thin film transistor is connected to a control terminal of an output unit connected to the trigger unit, K being an integer larger than 0, and
wherein the trigger clock is configured to turn off the trigger unit when a scan clock of the output unit is at a high level;
wherein an output signal of an $m^{th}$ GOA drive unit is a trigger signal of an $(m+N/2)^{th}$ GOA drive unit, N being a number of scan clocks in the GOA drive circuit, and N=2(K+1);
wherein m is an integer satisfying 0<m≤M, M being a number of GOA drive units.

15. The liquid crystal display panel according to claim 14, wherein a trigger unit in a $(K+1)^{th}$ GOA drive unit includes a third thin film transistor, which has a gate and a drain connected to the start vertical signal, and a source connected to a control terminal of an output unit in the $(K+1)^{th}$ GOA drive unit.

16. The liquid crystal display panel according to claim 15, wherein a trigger unit in each GOA drive unit following the $(K+1)^{th}$ GOA drive unit includes a fourth thin film transistor, which has a gate and a drain connected to a trigger signal corresponding to the trigger unit, and a source connected to a control terminal of an output unit connected to the trigger unit.

17. The liquid crystal display panel according to claim 15, wherein a trigger clock corresponding to a trigger unit of a $k^{th}$ GOA drive unit is a scan clock of an output unit in a $(k+N/2)^{th}$ GOA drive unit, k being an integer satisfying 0<k≤K.

18. The liquid crystal display panel according to claim 14, wherein a trigger clock corresponding to a trigger unit of a $k^{th}$ GOA drive unit is a scan clock of an output unit in a $(k+N/2)^{th}$ GOA drive unit, k being an integer satisfying 0<k≤K.

* * * * *